Aug. 4, 1925.
H. C. LORD
1,548,049
JOINT AND METHOD OF MAKING THE SAME
Filed Nov. 24, 1922
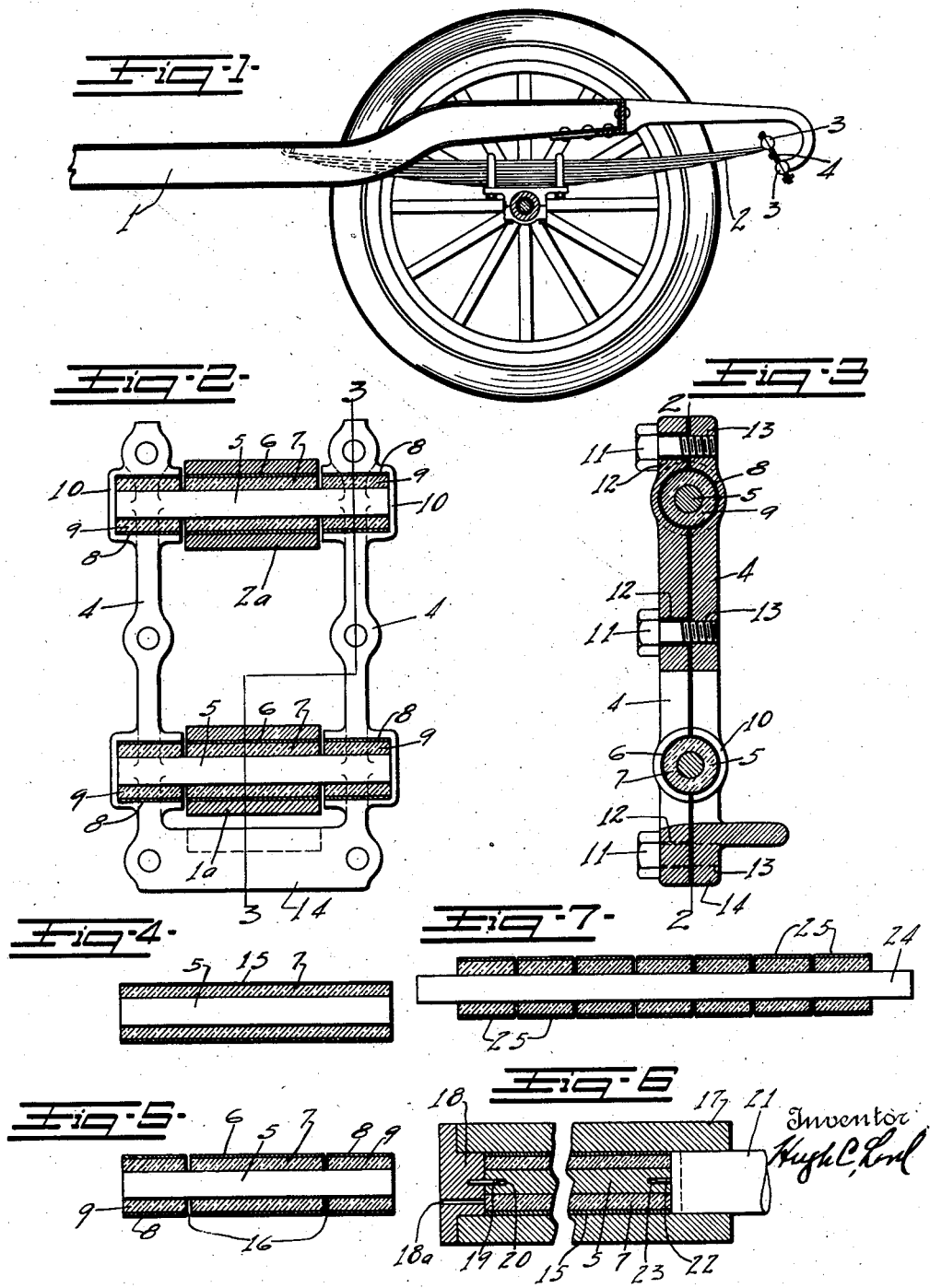

Patented Aug. 4, 1925.

1,548,049

UNITED STATES PATENT OFFICE.

HUGH C. LORD, OF ERIE, PENNSYLVANIA.

JOINT AND METHOD OF MAKING THE SAME.

Application filed November 24, 1922. Serial No. 602,995.

*To all whom it may concern:*

Be it known that I, HUGH C. LORD, a citizen of the United States, residing at Erie, in the county of Erie and State of Pennsylvania, have invented new and useful Improvements in Joints and Methods of Making the Same, of which the following is a specification.

The invention is directed to joints in which the joint members are united by a rubber insert, the rubber insert through its distortion sustaining the joint action. It is desirable to unite several joint members and this can be conveniently done with this form of joint by vulcanizing the rubber of the several joint members to a common central pin, or joint member. Such a joint is particularly desirable for shackle joints for springs and as shown is so illustrated. In forming such joints it is desirable to have the joint as a unit, that is to say, with a central pin and outer metallic shell which may be readily connected with the shackle hangers, or other members to which the joint is attached. In order to surely bond the rubber to these metal surfaces it is necessary to have the rubber under pressure and also to have the rubber co-extensive with the length of the metallic members, or at least one of the members and it is desirable to have the outer shell of uniform size so that it may be readily inserted in an automobile frame, or other part where it is used. The invention is directed to these different features and methods of making devices having these features.

The accompanying drawings show the features of the invention and means for carrying out the method as follows:—

Fig. 1 shows a side elevation of an automobile with a spring shackle in place thereon.

Fig. 2 a central section through a spring shackle on the line 2—2 in Fig. 3.

Fig. 3 a section on the line 3—3 in Fig. 2.

Fig. 4 a central section of the joint elements in an intermediate stage of manufacture.

Fig. 5 the completed article.

Fig. 6 a method of molding the joint.

Fig. 7 an alternative construction.

1 marks the chassis frame, 2 the spring, 3 the joint elements in the spring and frame of the shackle, and 4 the shackle hanger.

Each joint of the shackle has a central pin 5, a central shell 6, and a rubber joint member 7 bonded to the outer surfaces of the pin 5 and the inner surface of the shell 6. End joint members are formed on the pin 5, these having a shell 8 and rubber member 9 vulcanized to the pin 5 and to the inner surface of the shell 8.

The hangers 4 are formed in halves and have the cups 10 which receive the shells 8. The two halves are put together and screws 11 extend through perforations 12 in one half into screw-threaded openings 13 in the other half. In this way the shells 8 are clamped and locked against turning in the cups 10. The two sides of the hangers 4 are connected by a cross piece 14 which maintains the two sides in parallel and also forms the usual stop for preventing the reversing of the hanger by the action of the spring. The central shell 6 extends through a spring eye 2ª, the spring eye ordinarily being simply wedged open so as to permit of the slipping of the shell into place. The bottom shell 6 is forced into the eye 1ª of the frame and this locks it in place. Other means of securing it in the frame may be utilized if desired.

With this construction it will be seen that a single central member is used, thus doing away with any metallic joints or connections of any kind. At the same time the distortion of the rubber due to a given swinging of the hanger is divided between the rubber members 7 and 9, each receiving half of the twist.

This joint may be advantageously formed by the following method. The outer shells 6 and 8 are initially integral and the rubber for the whole element is vulcanized in place and bonded on the pin and shell as clearly shown in Fig. 4, the integral shell being indicated as 15. After the vulcanization of this formation the shell is parted at 16 and the rubber cut down to the central pin 5.

It is necessary to get the proper bonding and quality of rubber to vulcanize the rubber under pressure and in inserting the rubber in the shell 15 some excess is desirable at one end. By placing all the excess at one end and discharging it at the opposite end of the form it is possible to get a uniform pressure and at the same time to size the tubing 15.

In Fig. 6 I have shown a diagram of a mold for this purpose, the mold being in the form of a sleeve 17 in which the shell 15 with the inserted pin 5 and the rubber sufficient for the walls 7 and 9 is in place.

The sleeve is closed by a plug 18 at one end, this plug having a centering pin 19 entering an opening 20 in the end of the pin. A movable plunger 21 with a centering pin 22 is arranged at the opposite end, the centering pin operating in an opening 23 in the end of the pin 5. The excess of rubber as indicated in dotted lines is supplied at the end under the plunger 21 and the rubber supplied should be small in amount otherwise its movement through the metal parts may disturb the bonding coatings in these parts. The excess of rubber is discharged through an opening 18ª in the plug 18, the size of this opening determining to some extent the pressure to which the rubber is subjected in the mold. The pressure ordinarily used is ample to expand or extend the shell 15. In consequence the process of molding brings the shell 15 and consequently the shells 6 and 8 to an accurate gauge. This is important if the shell is to be inserted by pressure in the openings in the frame.

While in the preferred construction this is used for a joint of a spring shackle in the broader aspects of the invention a plurality of joints on a single pin may be utilized in the manner shown in Fig. 7 in which a single central pin 24 is provided, the ends of this pin forming the supports for a plurality of joints, each joint having an outer shell 25 and an intervening portion of rubber bonded to the shell 25 and to the pin 24.

What I claim as new is:—

1. In a joint, the combination of a central pin; a plurality of rubber units bonded on the pin; and joint members bonded on the outer surfaces of the rubber units.

2. In a joint, the combination of a central pin; a central elastic unit of rubber bonded on the pin; end units of rubber bonded on the pin approximating the axial length of the central unit; a joint member bonded on the outer surface of the central unit; and a joint member bonded on the outer surfaces of each of the end units of rubber.

3. In a joint, the combination of a central pin; a central elastic unit of rubber bonded on the pin; units of rubber bonded on the pin approximating the axial length of the central unit; a joint member bonded on the outer surface of the central unit; a joint member bonded on the outer surfaces of each of the end units of rubber; and a connection between the joint members on the end units compelling them to operate in unison.

4. The method of forming joints which consists in bonding an intermediate joint member of rubber to a central metallic member and an outer metallic member, and severing the outer metallic member and the rubber to form a plurality of joint members operating on the same central member.

5. The method of forming joint members which consists in assembling an outer metallic joint member, an inner metallic joint member with an interposed amount of rubber for forming an intermediate joint member, confining the outer joint member in a sleeve, subjecting the rubber to pressure and heat for the vulcanizing and the bonding of the rubber to the metallic members, the pressure expanding the outer joint member to give it a size corresponding to the mold sleeve.

6. The method of forming joint members which consists in assembling a central metallic member, an outer metallic member, and rubber for vulcanization between them with an excess of rubber at one end, confining the assembled articles within a mold, and providing an overflow for the rubber at the end opposite that having the excess.

7. The method of forming joints which consists in assembling a central metallic joint member, an outer metallic joint member with an intervening portion of rubber, centering the central joint member relatively to the outer member, and vulcanizing the rubber in place between the joint members under pressure.

8. In a joint for springs, the combination of a spring eye; an elastic rubber joint member secured within the spring eye; a central member to which the rubber member is secured; end rubber units locked with the central member; and joint members secured to the outer surfaces of the outer units of rubber.

9. In a joint for springs, the combination of a spring eye; a pin extending through the eye; a rubber insert between the pin and eye; rubber units at each side of the eye and locked with the pin; and shackles connected with the outer surfaces of the rubber units at the ends.

10. In a joint for springs, the combination of a spring eye; a joint element comprising a central metallic tube secured to the spring eye; a rubber elastic member within the metallic tube; a central pin to which the rubber member is secured; end rubber members locked with the pin; and shackles secured to the end members.

11. In a joint for springs, the combination of a spring eye; a pin extending through the spring eye; rubber bonded on the pin and secured to the spring eye; rubber units bonded on the ends of the pin; and shackles secured to the outer surfaces of the end units of rubber.

12. In a joint for springs, the combination of a spring eye; an elastic joint member comprising a central pin; a central rubber unit bonded on the pin; two end rubber units bonded on the pin; metallic shells bonded on the outer surfaces of the rubber units, the central metallic shell being secured in the spring eye; and shackles secured to the shells of the outer units.

13. In a joint for springs, the combination of a shackle comprising two shackle links; rubber units at each end of each shackle link and locked therewith; pins secured to the inner peripheries of said rubber units and extending from a rubber unit in one shackle to a rubber unit in the other shackle; central rubber units secured to said pins; a spring locked with one central rubber unit; and a support locked with the other of said central units.

14. In a joint for springs, the combination of shackle pins; rubber units secured to the shackle pins; metallic shells surrounding said rubber units; shackle links, said links comprising eyes in which the metallic shells are arranged; and means for closing the eyes to clamp the shackle links on the shells.

15. In a joint for springs, the combination of shackle pins; rubber units secured to the shackle pins; metallic shells surrounding said rubber units; shackle links, said links comprising eyes in which the metallic shells are arranged; means for closing the eyes to clamp the shackle links on the shells; and means for rigidly connecting the shackle links.

16. In a joint for springs, the combination of a shackle comprising shackle links; rubber units at each end of each shackle link and locked therewith; pins secured to the inner peripheries of said rubber units and extending from a rubber unit in one shackle to a rubber unit in the other shackle; central rubber units secured to said pins; a spring locked with one central rubber unit; a support locked with the other of said central units; and a rigid connection between the shackle links.

17. In a joint, the combination of a central pin; a plurality of rubber units bonded on the pin; and joint members secured to the outer surfaces of the rubber units.

18. In a joint, the combination of a central pin; a central elastic unit of rubber bonded on the pin; end units of rubber bonded on the pin approximating the axial length of the central pin; a joint member bonded on the outer surface of the central unit; and a joint member secured to the outer surfaces of each of the end units of rubber.

In testimony whereof I have hereunto set my hand.

HUGH C. LORD.